United States Patent [19]

Armbrust et al.

[11] Patent Number: 4,521,216
[45] Date of Patent: Jun. 4, 1985

[54] DISAZO DYES

[75] Inventors: Herbert Armbrust, Gruenstadt; Johannes P. Dix, Neuhofen; Guenter Hansen, Ludwigshafen; Georg Zeidler, Dannstadt-Schauernheim, all of Fed. Rep. of Germany

[73] Assignee: BASF Aktiengesellschaft, Ludwigshafen, Fed. Rep. of Germany

[21] Appl. No.: 478,100

[22] Filed: Mar. 23, 1983

[51] Int. Cl.³ ............... C09B 31/062; C09B 33/044; C09B 33/06; C09B 33/08
[52] U.S. Cl. ............... 8/639; 534/573; 534/649; 534/650; 534/651; 534/677; 534/688
[58] Field of Search .......... 260/184, 187, 186; 8/639

[56] References Cited

U.S. PATENT DOCUMENTS

| | | | |
|---|---|---|---|
| 2,009,063 | 7/1935 | Laska et al. | 260/191 X |
| 2,080,191 | 5/1937 | Straub et al. | 260/148 |
| 2,150,772 | 3/1939 | Lange | 260/191 X |
| 3,037,014 | 5/1962 | Liechti | 260/187 |
| 3,350,384 | 10/1967 | Conway | 260/184 |
| 3,476,500 | 11/1969 | Litke | 8/93 |

FOREIGN PATENT DOCUMENTS

| | | | |
|---|---|---|---|
| 0012297 | 6/1980 | European Pat. Off. | 260/184 |
| 1619319 | 10/1969 | Fed. Rep. of Germany | 260/184 |
| 2018937 | 11/1970 | Fed. Rep. of Germany | 260/184 |
| 1309903 | 3/1973 | United Kingdom | 260/184 |

OTHER PUBLICATIONS

Bykov et al., Chemical Abstracts, vol. 59, #4067f,g, (1963).

Primary Examiner—Floyd D. Higel
Attorney, Agent, or Firm—Oblon, Fisher, Spivak, McClelland & Maier

[57] ABSTRACT

Compounds of the general formula I

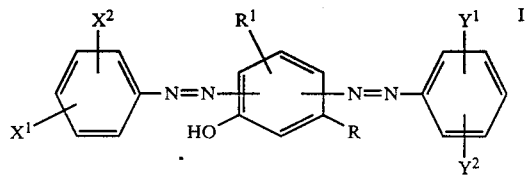

where R is hydroxyl or unsubstituted or substituted amino, $R^1$ is hydrogen or $C_1$–$C_{12}$-alkyl, $X^1$ and $Y^1$ independently of one another are each a carboxylic acid ester or ether group and $X^2$ and $Y^2$ independently of one another are each hydrogen, nitro or chlorine, are very useful for coloring petroleum products, solvents and engine fuel additives.

7 Claims, No Drawings

DISAZO DYES

BACKGROUND OF THE INVENTION

Field of the Invention

The present invention relates to compounds of the general formula I

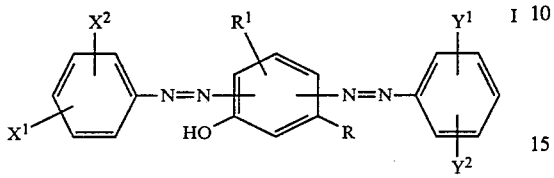

where R is hydroxyl or unsubstituted or substituted amino, $R^1$ is hydrogen or $C_1$–$C_{12}$-alkyl, $X^1$ and $Y^1$ independently of one another are each a carboxylic acid ester or ether group and $X^2$ and $Y^2$ independently of one another are each hydrogen, nitro or chlorine.

SUMMARY OF THE INVENTION

The present invention relates to compounds of the general formula I

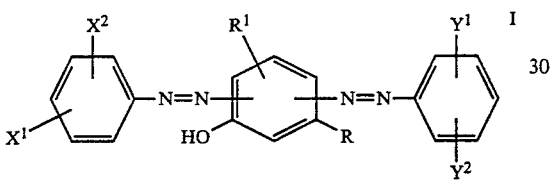

where R is hydroxyl or unsubstituted or substituted amino, $R^1$ is hydrogen or $C_1$–$C_{12}$ alkyl, $X^1$ and $Y^1$ independently of one another are each a carboxylic acid ester or ether group and $X^2$ and $Y^2$ independently of one another are each hydrogen, nitro or chlorine.

DESCRIPTION OF THE PREFERRED EMBODIMENTS

Amino radicals R include $NH_2$ as well as substituted amino radicals, for example those where alkyl can be straight-chain or branched and is of 1 to 15 carbon atoms, e.g. $NHCH_3$, $NH-C_2H_5$, $NH-C_3H_7$, $NH-C_4H_9$, $NHC_5H_{11}$, $NHC_6H_{13}$, $NH-C_7H_{15}$, $NH-C_8H_{17}$, $NH-C_9H_{19}$, $NH-C_{10}H_{21}$, $NH-C_{11}H_{23}$, $NHC_{12}H_{25}$ or $NH-C_{13}H_{27}$.

Alkyl radicals $R^1$ are those which have been stated for the amine substituents R and are of 1 to 13 carbon atoms.

Ether groups $X^1$ and/or $Y^1$ are, in particular, those which are of 1 to 15 carbon atoms and in which the carbon chain can be interrupted by oxygen. Particularly useful $X^1$ and $Y^1$ are $C_1$–$C_{15}$ alkoxy, $C_1$–$C_{15}$ alkoxy interrupted by oxygen and carboxylic acid esters, the alcoholic portion of which is $C_1$–$C_{15}$ alkyl. Specific examples are: $OCH_3$, $OC_2H_5$, $OC_3H_7$, $OC_4H_9$, $OC_5H_{11}$, $OC_6H_{13}$, $OC_7H_{15}$, $OC_8H_{17}$, $OC_9H_{19}$, $OC_{10}H_{21}$, $OC_{11}H_{23}$, $OC_{12}H_{25}$ and $OC_{13}H_{27}$ as well as $OC_2H_4OC_4H_9$, $OC_2H_4C_2H_5$ and $O(C_2H_4)OC_4H_9$.

Suitable alcohol radicals for the carboxylic acid ester radical $X^1$ and $Y^1$ are the alkoxy radicals stated for $X^1$ and $Y^1$, as well as, for example, $OC_6H_5$, $OC_6H_4CH_3$, $OC_6H_4C_2H_7$, $OC_6H_4C_4H_9$, $OC_6H_4C_9H_{19}$ and $OC_6H_4C_{12}H_{25}$.

Compounds of the formula I can be prepared by reacting diozonium compounds of amines of the formula II

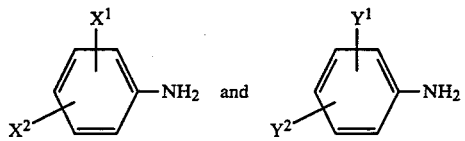

with a coupling component of the formula III

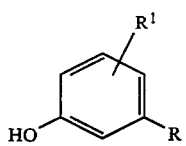

in a conventional manner. Details are to be found in the Examples, in which parts and percentages are by weight, unless stated otherwise.

The compounds of the formula I are from yellow to red, and are particularly useful for coloring petroleum products, solvents and gasoline additives, e.g. tetraethyl lead, since they are highly soluble in these liquids. They are therefore used essentially as marking substances.

Particularly important are compounds of the formula I a,

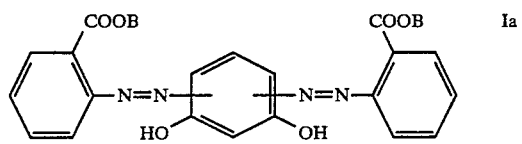

where B is a straight-chain or branched alkyl radical which is of 5 to 15, preferably 8 to 15, carbon atoms and can also be interrupted by oxygen, or B is substituted phenyl. Specific examples of preferred radicals B are $C_5H_{11}$, $C_6H_{13}$, $C_7H_{15}$, $C_8H_{17}$, $C_9H_{19}$, $C_{10}H_{11}$, $C_{11}H_{23}$, $C_{12}H_{25}$, $C_{13}H_{27}$, $C_2H_4OC_3H_7$, $C_2H_4OC_4H_9$, $C_2H_4OC_2H_4OC_3H_7$,

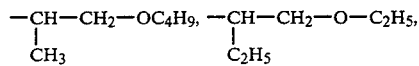

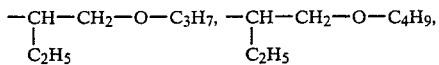

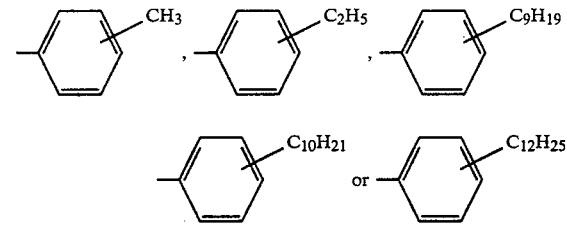

The invention furthermore relates to mixtures of compounds of the formulae I and I a, as obtained, for example, when several diazo and/or coupling components are used in the coupling reaction. The mixtures are as a rule more soluble than individual compounds.

EXAMPLES

EXAMPLE 1

82 parts of isononyl anthranilate in 75 parts by volume of toluene were added to a mixture of 75 parts by volume of 32% strength hydrochloric acid and 300 parts of ice. 21 parts of sodium nitrite in 60 parts of water were added dropwise at below 5°C., while stirring. The mixture was stirred for 1.5 hours at not more than 5° C., excess nitrite was destroyed with a little amidosulfonic acid, and 16.5 parts of resorcinol were added. The mixture was buffered at pH 4 with sodium acetate, and after coupling was complete, 75 parts by volume of toluene were added. The aqueous phase was separated off, the organic phase was washed with twice 300 parts of water and then isolated and the solvent was distilled off under reduced pressure to give 104 parts of the dye of the formula

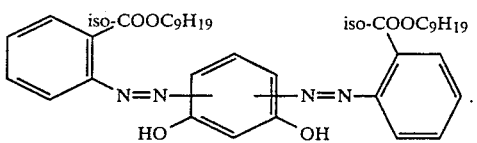

This dye is very suitable for coloring engine fuels, fuel oils, finishes, waxes and fats.

EXAMPLE 2

125 parts of 2-ethylhexyl anthranilate and 132 parts of isononyl anthranilate dissolved in 250 parts by volume of toluene were added to a mixture of 250 parts by volume of 32% strength hydrochloric acid and 1,000 parts of ice. 70 parts of sodium nitrite in 200 parts of water were added, after which the mixture was stirred for 1.5 hours at not more than 5° C., and excess nitrite was destroyed with amidosulfonic acid. 55 parts of resorcinol were added, and the mixture was then buffered at pH 4 with sodium acetate, and diluted with 250 parts by volume of toluene after coupling was complete. The organic phase was separated off and washed with water, and the solvent was distilled off under reduced pressure to give 292 parts of a dye mixture of the formula

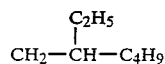

where R=

$$CH_2-\underset{\underset{C_2H_5}{|}}{CH}-C_4H_9$$

and iso-$C_9H_{19}$. This dye mixture is very useful for coloring engine fuels, fuel oils, finishes, waxes and fats.

EXAMPLE 3

381 parts of dodecylphenyl anthranilate were diazotised by a procedure similar to that described in Example 1 or 2, and the product was coupled with 55 parts of resorcinol to give 403 parts of the dye of the formula

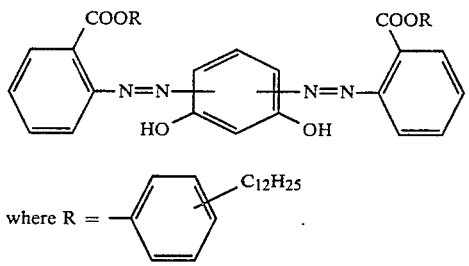

This dye is very useful for coloring engine fuels, fuel oils, finishes, waxes and fats.

The dyes of the formula $$D-N=N-K-N=N-D$$

which are listed in Table 1 were prepared by a procedure similar to that described in Examples 1, 2 or 3. When two different diazo components are used, the corresponding mixture of 3 different dyes is formed; in such a case, the two diazo components are shown in the Table.

TABLE I

| Example | D | K |
|---|---|---|
| 4 | -C4H9 phenyl) | resorcinol (HO-C6H4-OH) |
| 5 | iso-COOC10H21 phenyl | resorcinol |
| 6 | COO(C2H4O)2C3H7 phenyl | resorcinol |

TABLE I-continued

| Example | D | K |
|---|---|---|
| 7 | 2-methyl phenyl COOC₁₃H₂₇ | resorcinol (HO-C₆H₄-OH, 1,3) |
| 8 | 5-nitro-2-methyl phenyl iso-COOC₉H₁₉ | resorcinol |
| 9 | 4-(H₁₉C₉O)-phenyl methyl | resorcinol |
| 10 | phenyl -CCH₂-CH(C₂H₅)-C₄H₉ | resorcinol |
| 11 | 2-methyl phenyl COOCH₃ | 4-(NHC₁₃H₂₇)-resorcinol |
| 12 | 2-methyl phenyl iso-COOC₉H₁₉ | 4-(NHC₁₃H₂₇)-resorcinol |
| 13 | 2-methyl phenyl iso-COOC₉H₁₉ | 4-(C(CH₃)₂C₂H₅)-resorcinol |

| Example | D₁ | D₂ | K |
|---|---|---|---|
| 14 | 2-methyl phenyl iso-COOC₉H₁₉ | 2-methyl phenyl iso-COOC₁₀H₂₁ | resorcinol |
| 15 | 2-methyl phenyl iso-COOC₉H₁₉ | 2-methyl phenyl COO(C₂H₄O)₂C₃H₇ | resorcinol |
| 16 | 2-methyl phenyl iso-COOC₉H₁₉ | 2-methyl phenyl COOC₁₃H₂₇ | resorcinol |
| 17 | 2-methyl phenyl iso-COOC₁₀H₂₁ | 2-methyl phenyl COOC₁₃H₂₇ | resorcinol |

TABLE I-continued

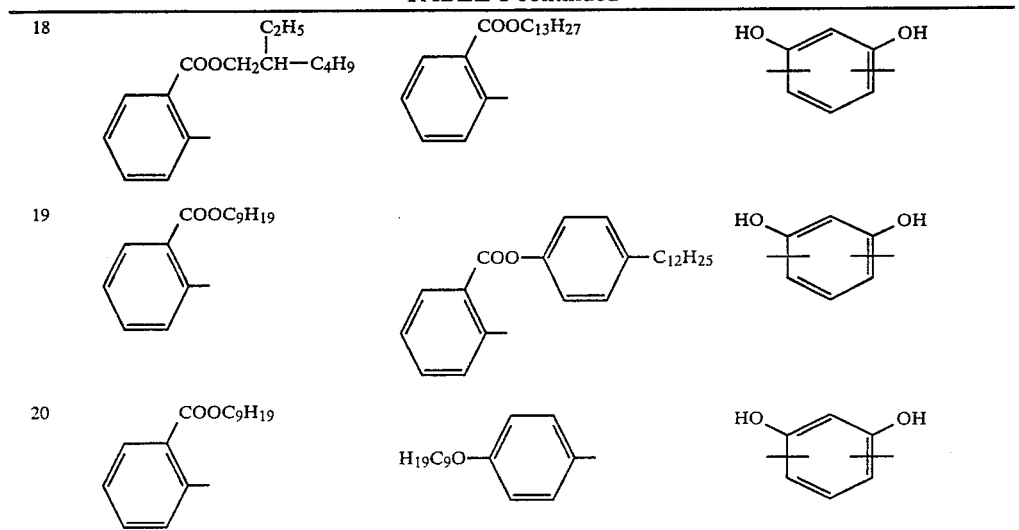

EXAMPLE 21

48 parts of n-butyl anthranilate, 48 parts of iso-butyl anthranilate, 52 parts of n-pentyl anthranilate and 52 parts of iso-pentyl anthranilate were dissolved in 250 parts by volume of toluene, and 1,000 parts of ice and 250 parts by volume of 32% strength hydrochloric acid were added. Diazotisation was effected by adding 70 parts of sodium nitrite in 150 parts of water. After 1.5 hours, excess nitrite was eliminated by means of a little amido-sulfonic acid. 55 parts of resorcinol were added, after which the pH was brought to 4 with sodium acetate, at not more than 10° C. When coupling was complete, the mixture was heated to 60° C., the aqueous phase was separated off and the organic phase was washed twice with warm water and evaporated down under reduced pressure to give 270 parts of a dye mixture of the formula

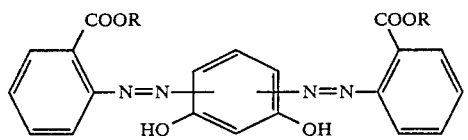

where R=n- and i-$C_4H_9$ and n- and i-$C_5H_{11}$. This dye mixture is useful for coloring engine fuels, fuel oils, finishes, waxes and fats.

We claim:

1. A disazo dye of the formula:

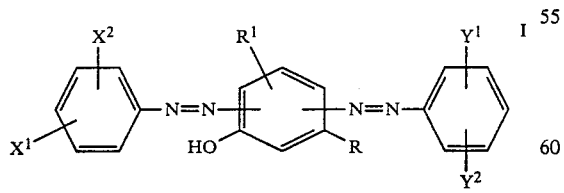

wherein
R is hydroxyl, amino or amino which is substituted by branched or unbranched $C_1$-$C_{15}$ alkyl;
$R^1$ is hydrogen or $C_1$-$C_{12}$-alkyl;
$X^1$ and $Y^1$ independently of one another are each $C_1$-$C_{15}$-alkoxy, $C_1$-$C_{15}$- alkoxy interrupted by oxygen, or carboxylic acid ester, the alcoholic portion of which is $C_1$-$C_{15}$-alkyl; and
$X^2$ and $Y^2$ independently of one another are each hydrogen, nitro and chlorine.

2. The compound of claim 1, of the formula

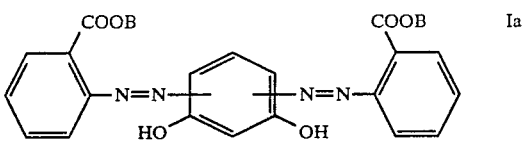

wherein
B is selected from the group consisting of straight-chain or branched $C_5$-$C_{15}$ alkyl, straight-chain or branched $C_5$-$C_{15}$ alkyl containing an oxygen atom, and phenyl substituted by $C_1$-$C_{12}$ alkyl.

3. The disazo dye of claim 1 wherein R is selected from the group of alkylamines consisting of $NHR_1$, wherein $R_1$ is $C_1$-$C_{13}$ alkyl.

4. The disazo dye of claim 1 wherein $X^1$ and $Y^1$ are selected from the group consisting of $OR_2$, wherein $R_2$ is $C_1$-$C_{13}$ alkyl, $OC_2H_4OC_4H_9$, $OC_2H_4C_2H_5$ or, $O(C_2H_4)OC_4H_9$.

5. The disazo dye of claim 2 wherein B is $C_8$-$C_{15}$ alkyl.

6. The disazo dye of claim 2 wherein B is selected from the group consisting of $C_5$-$C_{13}$ alkyl, $C_2H_4OC_3H_7$, $C_2H_4OC_4H_9$, $C_2H_4OC_2H_4OC_3H_7$, $$-\underset{\underset{CH_3}{|}}{CH}-CH_2-OC_4H_9, \quad -\underset{\underset{C_2H_5}{|}}{CH}-CH_2-O-C_2H_5,$$

$$-\underset{\underset{C_2H_5}{|}}{CH}-CH_2-O-C_3H_7, \quad -\underset{\underset{C_2H_5}{|}}{CH}-CH_2OC_4H_9,$$

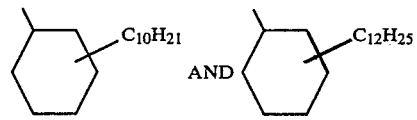

7. A mixture of the disazo dye of the formula

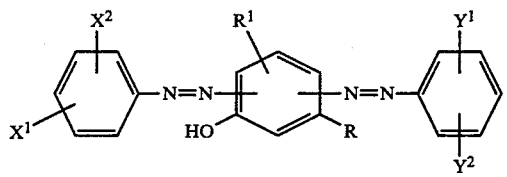

wherein

R is hydroxyl, amino or amino substituted by branched or unbranched $C_1$–$C_{13}$ alkyl;

$R^1$ is hydrogen or $C_1$–$C_{12}$-alkyl;

$X^1$ and $Y^1$ independently of one another are selected from the group consisting of $C_1$–$C_{15}$ alkoxy, $C_1$–$C_{15}$ alkoxy interrupted by oxygen, or carboxylic acid ester, the alcoholic portion of which is $C_1$–$C_{15}$ alkyl; and $X^2$ and $Y_2$ independently of one another are each hydrogen, nitro or chlorine; and the disazo dye of claim 2, of the formula

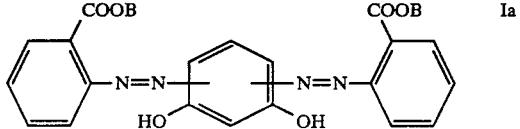

wherein

B is selected from the group consisting of a $C_5$–$C_{15}$ straight-chain or branched alkyl radical, a $C_5$–$C_{15}$ straight-chain or branched alkyl radical containing an oxygen atom, and phenyl substituted by $C_1$–$C_{12}$ alkyl.

* * * * *

UNITED STATES PATENT AND TRADEMARK OFFICE
CERTIFICATE OF CORRECTION

PATENT NO. : 4,521,216

DATED : June 4, 1985

INVENTOR(S) : Armbrust et al

It is certified that error appears in the above-identified patent and that said Letters Patent is hereby corrected as shown below:

On the title page;

The priority information has been omitted:

--[30] WEST GERMANY 3212241 04/02/1982--

Signed and Sealed this

Thirteenth Day of August 1985

[SEAL]

Attest:

DONALD J. QUIGG

Attesting Officer　　Acting Commissioner of Patents and Trademarks